United States Patent Office 3,147,069
Patented Sept. 1, 1964

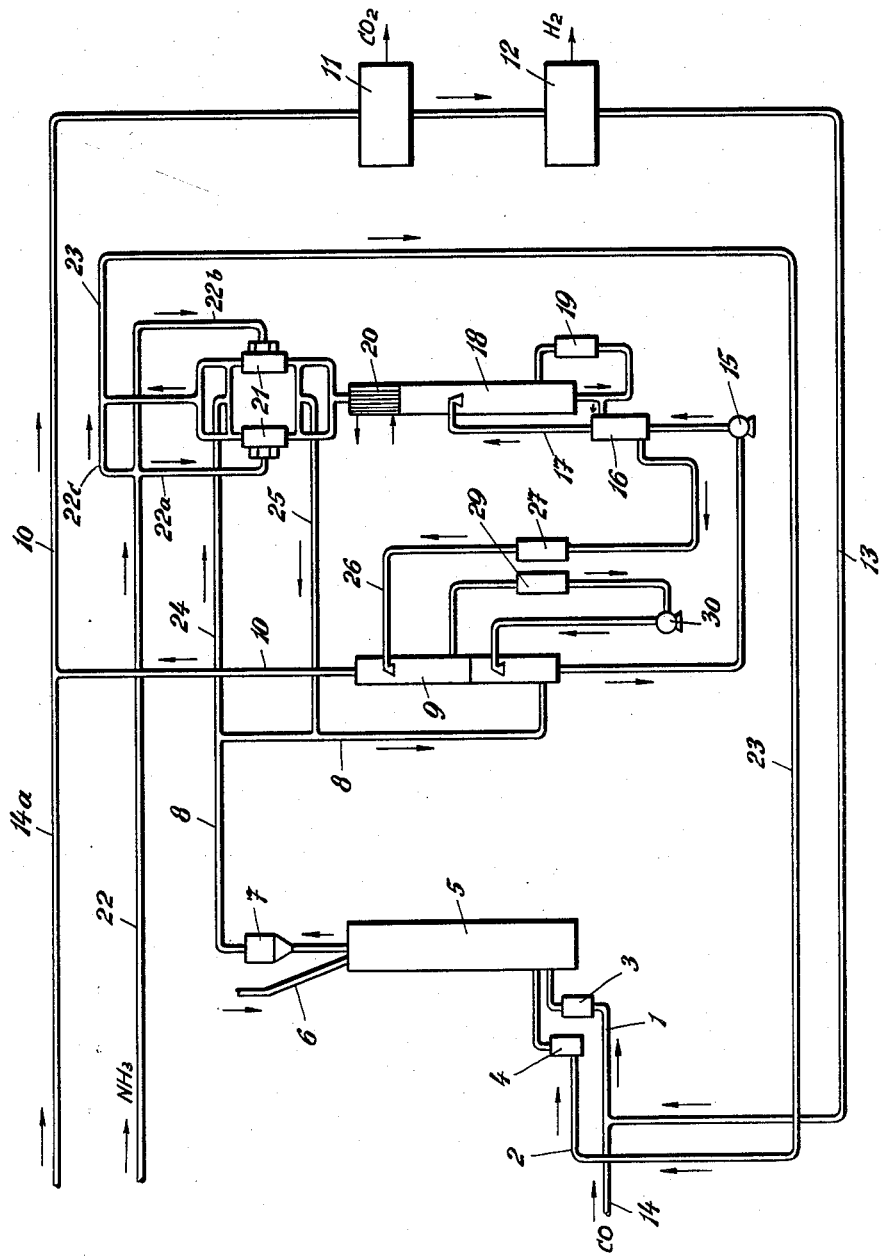

3,147,069
CONTINUOUS PROCESSING OF THE WASTE GASES FROM THE WHITE CALCIUM CYANAMIDE MANUFACTURE
Herwig Höger, Trostberg, Franz Kaess, Traunstein, Hermann Kronacher, Trostberg, and Thomas Fischer, Traunstein, Germany, assignors to Suddeutsche Kalkstickstoff-Werke Aktiengesellschaft, Trostberg, Germany
Filed Dec. 21, 1960, Ser. No. 77,420
Claims priority, application Germany Jan. 18, 1960
6 Claims. (Cl. 23—2)

The invention relates to the recovery of the waste gases in the manufacture of white calcium cyanamide.

White calcium cyanamide is prepared by reaction of calcium oxide or carbonate with gas mixtures containing hydrogen cyanide or carbon monoxide and ammonia. The economy of the process depends on the recovery and re-use of the waste gases, which contain, in addition to un-consumed ammonia and carbon monoxide, hydrogen cyanide, nitrogen, carbon dioxide and hydrogen. The two latter gases interfere with the reaction and must, therefore, not be recycled into the process.

In the gas recovery procedure, the main difficulties reside in the separation of the nitrogen-containing components, ammonia and hydrogen cyanide, from the carbon dioxide, and in preventing HCN polymerization. In spite of many proposals, these difficulties have not yet been satisfactorily met.

One of said proposals is a method to recover the ammonia in several steps, whereby first the entire carbon dioxide is washed out with the required amount of ammonia; the solid ammonium compound is separated from the wash liquor and recovered as by-product. A drawback of this method is that, in a well run plant, the carbon dioxide as reaction product should exceed the unconsumed ammonia in the waste gas, so that fresh ammonia must be added.

Methods are also known according to which the ammonia is combined with acids like $HNO_3$ and thus removed from the gas mixture. The formed ammonium salt may be split in a second step by means of bases, such as $Ca(OH)_2$, and by heating the ammonia may be recovered free from carbon dioxide. Also in these methods, by-products are obtained the price of which determines the economy of the calcium cyanamide manufacture.

Attempts have also been made to combine the ammonia with weak acids and then to split the ammonium salts but such methods have not been used in commerce, because of the high energy requirements. In addition, a further process step is necessary to recover the hydrogen cyanide from the carbon dioxide containing gas.

It has also been proposed to remove ammonia from gas mixtures by means of sufficient amounts of carbon dioxide in the absorption and subsequent stripping operation; this method does not make sense for the instant process because the added carbon dioxide prevents almost completely enrichment of the hydrogen cyanide in the scrubbing solution, and because additional steps become necessary to remove hydrogen cyanide, on the one hand, and the excess carbon dioxide, on the other hand.

Finally, a method is known according to which the gases coming from the calcium cyanamide synthesis are passed over dry potassium carbonate containing masses of large surface, where the separation of carbon dioxide and ammonia is obtained by selective absorption. The gases freed from carbon dioxide are processed to obtain ammonia and carbon monoxide to be added to the fresh synthesis gases. The hydrogen cyanide contained in the gases in partially bound to the carbonate containing mass; another part enters the $CO_2$-free residual gas; in both cases, it must be separately processed for the recovery and/or recycling into the cyanamide process. Because of the required large space for the absorption masses, of which the absorption capacity for $CO_2$ is far below the theoretic value, the method requires relative large apparatus and a continuous control of temperature and moisture, which is particularly difficult in batch operation. A decisive drawback, however, is the steadily decreasing receptivity of the mass for $CO_2$; as a result, only a fraction of the carbon dioxide absorbed by the fresh mass is absorbed after a short operating period. This fast loss of activity is due to the change of the originally large surface structure by the alternating absorbing and regenerating steps. The deposits of explosive hydrogen cyanide polymerization products present, in addition, a considerable danger. For all these reasons, also this method was not accepted for commercial operation.

In constrast to the described prior art proposals, the method of the invention allows the smooth separation of the two nitrogen components, ammonia and hydrogen cyanide, from the other components of the gas mixture, particularly carbon dioxide; it permits an economic joint recycling of said two gases into the nitrogenating process without the difficulties encountered heretofore and without obtaining by-products.

The invention comprises the following steps: Ammonia and hydrogen cyanide are selectively recovered from the waste gases in one wash step and separated to a large extent from carbon dioxide; the wash solution enriched with ammonia and containing hydrogen cyanide and traces of carbon dioxide is regenerated by distillation and recycled into the washing step; in order to condense substantially the water vapor, the vapors from the distillation are pre-cooled to a temperature still above the beginning precipitation of solid compounds, which temperature is preferably about 55 to 65° C.; finally, the gases are further cooled to about 15 to 35° C. in order to remove carbon dioxide in form of its ammonium compounds, and the ammonia-hydrogen cyanide mixture freed from carbon dioxide is returned to the fresh producer gas.

The invention allows of reusing economically the by-products of the white calcium cyanamide synthesis in the process itself without separation of the ammonia and hydrogen cyanide.

We have found that by means of selective scrubbing not only the undesired absorption of carbon dioxide may be reduced to a minimum but that the ammonia may be enriched in the scrubbing solution with almost complete removal of the ammonia and hydrogen cyanide from the gas mixture. In accordance with a preferred embodiment of the invention, we employ the principle of the so-called "short wash" where liquid-gas contact times of less than 10 seconds, sometimes even less than 1 second, are used. (See Bähr, Brennstoffchemie, vol. 36 (1955), p. 133.) Heretofore, such selective scrubbing procedures had been limited to the separation of the acidic components of coke oven gases, namely $CO_2$ from $H_2S$ and HCN, by means of alkaline e.g. ammoniacal solutions; it could not be expected that ammonia itself could be readily separated in this way from carbon dioxide. As scrubbing liquid, we prefer to use the diluted solution of a weak acid, such as boric, phosphoric, or acetic acid, which gives off the ammonia on heating. Particularly suitable are solutions of boric acid-polyhydroxy complexes as disclosed, for instance, in Patent No. 2,590,146 to G. Barsky. Examples of such complexes are the boric acid complexes with sorbitol or glycerol. The acid content of the solution should not be sufficient to bind the entire ammonia; the ammonia should rather be dissolved to a large extent as "free $NH_3$" so as to require as little energy as possible for stripping and allowing the hydrogen cyanide to combine with excess ammonia. It suffices to use an acid concentration which is sufficient to retain all traces of ammonia leaving the scrubber in countercurrent absorption.

Water or other neutral solvents may also be used as scrubbing liquids.

Due to the enrichment of the scrubbing liquid with ammonia, the amount of circulating scrubbing liquid and energy consumption for stripping remain very low.

It was also found that the scrubbing may be carried out without additional carbon dioxide consumption at increased pressures up to about 10 atm. above atmospheric pressure when the conditions required for the selective absorption such as short residence times, liquid distribution, etc. are satisfied. The scrubbing liquid may be passed into the scrubber in several steps simultaneously or sequentially.

The saturated scrubbing liquid, which contains, in addition to ammonia and hydrogen cyanide, still small amounts of carbon dioxide, is freed from the dissolved gases by heating in a stripper. The precooled vapors are passed into a condenser in which the carbon dioxide is precipitated in form of ammonium compounds, from which it is vaporized by subsequent heating and returned to the scrubbing stage. The precooling of the vapors is preferably done by means of a dephlegmator arranged behind the stripper column; in the dephlegmator, the vapors are cooled only so far that no ammonium salts but only moisture is precipitated (55 to 65° C.). Further cooling to 35 to 15° C. takes place in the following condensers in which the carbon dioxide is precipitated as ammonium carbonate or carbamate. Suitable simple condensers are coolers on the cooling surfaces of which the carbon dioxide compound progressively precipitates.

More suitable is the precipitation by direct cold supply with utilization of the heat of evaporation of the fresh ammonia required for the synthesis; in such procedure, the cooling surfaces for the condensation can be omitted so as to reduce the size of the condenser. It is also possible to use combinations of direct and indirect cooling.

In order to prevent precipitation of ammonium cyanide, it is necessary not to cool the gas below the precipitation temperature thereof which depends on the partial pressure of the hydrogen cyanide and is in the range of 15 to 35° C. At those temperatures, the $CO_2$ partial pressures of the $CO_2.NH_3$ compounds are already so low that the outgoing $NH_3.HCN$ mixtures contain less than 0.1 percent by volume of $CO_2$. The precipitation of the carbon dioxide compounds produces a considerable drying effect on the ammonia gas because water vapor is consumed in the formation of ammonium carbonate and its concentration, particularly under elevated pressure, is far reduced below the value which is normally attainable by cooling moist ammonia gas. It is of advantage to use two switchable condensers which are alternately used as condensers nd regenerators. For regeneration, it is sufficient to heat the condensing surfaces beyond the condensation temperature of the condensate, for instance to about 80° C. However, it is also possible to pass a heated gas current through the condenser for direct heat supply or for speeding up the evaporation of the ammonium salt deposits.

We have found that the admission of a moist gas for the evaporation produces a considerably faster operation. A probable explanation is that the water content of the gas promotes the formation of ammonium carbonate which is easier volatized than the otherwise formed carbamate. As warm or hot gases, we may use water vapor containing gases (e.g. nitrogen, carbon monoxide) or a branched-off part of the waste gases from the white calcium cyanamide manufacture. It is also possible to use the gas leaving the selective scrubber as said gas is already saturated with water vapor. The vaporized condensates are returned into the scrubbing step for the recovery of the ammonia. As the dissolved carbon dioxide is only a fraction of the total carbon dioxide contained in the synthesis gas, the recycling of said carbon dioxide fraction into the scrubber does not affect the subsequent $CO_2$ scrubbing.

Stripping and condensation as well as regeneration may be carried out at elevated pressures, for instance at pressures up to 10 atm. over atmospheric pressure. It is, for instance, of advantage to carry out the stripping operation under a higher pressure than the $CaCN_2$ synthesis and scrubbing in order to be able to return the stripped $NH_3$—HCN mixture without additional compression into the reaction stage.

The regenerated scrubbing solution leaves the stripper column in weakly acid or neutral condition and is returned, after cooling in a heat exchanger, into the scrubbing stage.

After removal of the ammonia and hydrocyanic acid, the further processing of the residual waste gases comprises the removal of the carbon dioxide according to conventional procedures and the separation into a carbon monoxide and a hydrogen fraction. While the carbon monoxide is recycled directly in the process, the hydrogen may be used for the synthesis of ammonia and passed as such ammonia into the $CaCN_2$ synthesis. Also the carbon dioxide may be, wholly or in part, converted to carbon monoxide in a CO generator and then used for the $CaCN_2$ synthesis.

The accompanying drawing illustrates diagrammatically an apparatus in which the method of the present invention may be carried out, and the following example is described with reference to such apparatus.

*Example*

In a plant for the production of high percent white calcium cyanamide, carbon monoxide is passed through conduit 1, and heat exchanger 3, and an ammonia-carbon monoxide mixture is passed through conduit 2 and heat exchanger 4 into the reactor 5 and reacted therein with lime charged through line 6.

The waste gases from the reactor contain, according to the mixing ratio of the fresh gases, 5 to 15 percent by volume of $NH_3$, 1.5 to 2 percent of HCN, 6 to 11 percent of $CO_2$, the balance being CO, $H_2$, and moisture. The gases pass through a dust collector and cooler 7 and lines 8 with a super-atmospheric pressure of about 2 to 3 atm. into the two-step selective scrubber 9 in which they are scrubbed with a 3% phosphoric acid solution. The contact time between gas and liquid is adjusted to about 4.5 seconds.

While substantially the entire ammonia and hydrogen cyanide are dissolved, only about 5 to 10 percent of the $CO_2$ are absorbed by the solution. The gases freed from ammonia and hydrogen cyanide continue through line 10 to a $CO_2$ removal system 11 and a $CO/H_2$ separation plant 12. The CO obtained therein, which may contain nitrogen, is recycled through line 13 and mixed with fresh CO from line 14 to re-enter line 1 and the reactor.

The solution leaving scrubber 9 is enriched in ammonia and contains hydrogen cyanide and small amounts of carbon dioxide; it is pumped by means of pump 15 through a heat exchanger 16 and a line 17 into the stripper column 18 under a superatmospheric pressure of about 3 to 4 atm. which is higher than the pressure in the reactor. In the stripper, the dissolved compounds are driven off by a circulating gas heater 19. In the dephlegmator 20 the vapors are cooled to a temperature of about 55 to 60° C., subsequently they are passed through either of the $CO_2$ separators 21, in which they are further cooled and the carbon dioxide is precipitated as ammonium carbonate or carbamate. The separators 21 are of the injection condenser type, where liquid ammonia entering through lines 22a and 22b is sprayed between the condensing surfaces so that the temperature thereof does not fall below 20° C. The hydrogen cyanide-ammonia gas, which may contain up to 0.3 percent of $CO_2$, may receive fresh ammonia through line 22c and is recycled into the synthesis through line 23.

After switching off the respective separator 21, the precipitated carbonic acid compounds are vaporized at a temperature of about 80 to 100° C. by means of a branched-off portion of the still hot reactor gases 24 and passed therewith through line 25 into the selective scrubber 9, while the vapors from the dephlegmator 20 pass during this time through the other separator.

The stripped solution from stripper column 18 is cooled in heat exchanger 16 and after-cooler 27; it is recycled through line 26 to the upper stage of scrubber 9, withdrawn from the middle portion of the scrubber, cooled in heat exchanger 29, and recycled by means of pump 30 into the lower step of scrubber 9.

We claim:

1. A method for the continuous processing of the waste gases from the white calcium cyanamide manufacture which gases contain ammonia, hydrocyanic acid, and about 6 to 11 percent of carbon dioxide, said method comprising contacting the gases in a scrubbing stage containing a neutral to weakly acidic solution for a period of 1 to 10 seconds, thereby removing substantially the entire ammonia and hydrocyanic acid and only part of said carbon dioxide, which part does not exceed 10 percent of the carbon dioxide present, subjecting said solution to distillative regeneration, the vapors of said distillation containing essentially said absorbed ammonia, hydrocyanic acid, and carbon dioxide, continuously returning the stripped scrubbing solution to the scrubbing stage, cooling said vapors to a temperature of about 55 to 65° C. so as to condense the major part of the water vapor contained therein without precipitating any absorbed ammonium salts, subsequently cooling the vapors to a temperature of about 15 to 35° C., thereby precipitating carbon dioxide in form of ammonium salts, and recycling the remaining vapors containing ammonia and hydrocyanic acid into the white calcium cyanamide synthesis.

2. The method as defined in claim 1 wherein said distillative regeneration is carried out under a superatmospheric pressure up to about 10 atmospheres.

3. The method claimed in claim 1 wherein the scrubbing solution is an aqueous solution of a weak nonvolatile acid.

4. The method claimed in claim 1 wherein the cooling for precipitating said ammonium salts is produced by evaporation of liquid ammonia.

5. The method claimed in claim 1 including the step of evaporating said precipitated ammonium salts in situ and returning the vapors into the scrubbing stage.

6. The method as claimed in claim 5 wherein said ammonium salts are evaporated in a moist gas current.

References Cited in the file of this patent

UNITED STATES PATENTS

| | | |
|---|---|---|
| 2,590,146 | Barsky | Mar. 25, 1952 |
| 2,756,841 | Asendorf | July 31, 1956 |
| 2,899,274 | Smith et al. | Aug. 11, 1959 |
| 2,940,824 | Kaess et al. | June 14, 1960 |

FOREIGN PATENTS

| | | |
|---|---|---|
| 697,505 | Great Britain | Sept. 23, 1953 |